Patented Jan. 12, 1954

2,666,067

UNITED STATES PATENT OFFICE 2,666,067

SIMULTANEOUS OXIDATION AND HALOGENATION OF STEROIDS

Arthur R. Hanze and Robert H. Levin, Kalamazoo, Mich., assignors to The Upjohn Company, Kalamazoo, Mich., a corporation of Michigan No Drawing. Application October 3, 1951, Serial No. 249,617

18 Claims. (Cl. 260—397.4)

The present invention relates to a novel process for the preparation of certain steroid compounds and is more particularly concerned with a process for the production of 4-halo-21-acyloxy-17-hydroxypregnane-3,11,20-triones by the concurrent oxidation and halogenation of 21-acyloxy-3,17-dihydroxypregnane-11,20-diones, and with certain novel compounds thus produced.

It is an object of the present invention to provide a novel process for the oxidation and halogenation of 21-acyloxy-3,17-dihydroxypregnane-11,20-diones to produce 4-halo-21-acyloxy-17-hydroxypregnane-3,11,20-triones. Other objects of the invention will be apparent to those skilled in the art to which this invention pertains.

According to the method of the present invention a 21-acyloxy-3,17-dihydroxypregnane-11,20-dione is reacted with an oxidation-halogenation agent to cause conversion of the hydroxyl group at carbon atom three of the steroid nucleus to a ketone group and to cause halogenation at carbon atom four of the steroid nucleus in a single step procedure.

The starting compounds for the method of the present invention are 21-acyloxy-3,17-dihydroxypregnane-11,20-diones. In these compounds the acyloxy group contains from one to eight carbon atoms, such acyloxy groups including, for example, formoxy, acetoxy, propionoxy, butanoyloxy, isobutanoyloxy, valeroyloxy, hexanolyloxy, heptanoyloxy, octanoyloxy, and the like. The starting 21-acyloxy compounds are prepared by replacement of the 21-bromine atom in 21-bromo-3,17-dihydroxypregnane-11,20-dione using the selected organic acid sodium salt or by acylation of the corresponding 21-hydroxy compound. For the purposes of the process of the present invention, the acyloxy groups of the starting material may carry non-reactive substituents such as halo, alkoxy, alkyl or the like of desired.

The agents used in the process of the invention are those which are capable of producing oxidation and halogenation, such as, for example, N-bromoacetamide, N-bromosuccinimide, N-chlorosuccinimide, 3-bromo-5,5-dimethylhydantoin, and 1,3-dibromo-5,5-dimethylhydantoin. These reagents have all been found to possess the capacity of effecting concurrent oxidation of the hydroxy group at carbon atom three and halogenation of the four position in the nucleus of the starting material. For the accomplishment of such result and attainment of high yields, at least the theoretical amount of oxidizing-halogenating agent should be employed. When the agent contains a single bromine or chlorine atom, the theoretical proportion is two moles of agent to one mole of starting steroid, but when two halogen atoms are present in the oxidizing-halogenating agent, only one mole of agent per mole of steroid is theoretically required. Ordinarily, it is preferred to use an excess of oxidation-halogenation reagent over the theoretical amount, e. g. from two to five moles of agent per mole of steroid, although even higher molar ratios may be used if desired. Less than the theoretical proportion may be used if desired, but it should be obvious that lower yields and conversions are obtained in such manner.

Tertiary butanol is the preferred solvent, but other solvents, which are not subject to oxidation or halogenation under the conditions of reaction, such as dioxane, tertiary alkanols, and the like, may be used, if edsired, and the selection of a suitable solvent will be apparent to one skilled in the art.

In carrying out the process of the present invention, one molar part of a 21-acyloxy-3,17-dihydroxypregnane-11,20-dione is admixed, using either order of addition, with at least the theoretical amount of the oxidizing-halogenating agent in the presence of an organic solvent which is not subject to oxidation or halogenation under the conditions of the reaction, at a temperature below about fifty degrees centigrade, preferably between about fifteen and about forty degrees centigrade. Pyridine and other acid-binding agents should not be employed as solvents nor should substantial amounts of other basic reagents such as potassium acetate, or the like, be added to or be present in the reaction mixture, as the presence of such reagents may impede, hinder or prevent the halogenation step of the reaction.

The length of the reaction period is not critical, depending somewhat upon the starting materials and reaction conditions employed, and in this respect varying somewhat inversely with the temperature employed. Reaction periods of between about one and ten days have been found satisfactory, for example, using room temperature.

At the end of the reaction period, the desired product, the 4-halo-21-acyloxy-17-hydroxypregnane-3,11,20-trione, may usually be separated from the reaction products as a crystalline solid, washed with solvent, and dried to give the more highly purified crystalline material. Additional material may be obtained by the addition of water to the filtrate.

The yield of desired reaction product is usually between about fifty and about seventy-five percent, yields of 65 percent being obtained consistently by application of the optimum reaction conditions. However, conversions of 85-90 percent are obtained since additional material of low purity obtained by extraction of the mother liquors can be reduced with zinc in acetic acid to give the 21-acyloxy-17-hydroxypregnane-3,11,-20-trione. This can then be converted to the corresponding 4-halo steroid by reaction with the appropriate halogen. The presence of water in an amount of between about traces to about eighteen percent of the volume of solvent is advantageous. With no water present the reaction proceeds comparatively sluggishly, while with considerable water present the same result is observed. However, with between about one to about eighteen percent, preferably about one to five percent of water, the reaction proceeds at a reasonable rate and gives high yields of desired product. Addition to the reaction mixture of an acid such as a hydrohalic acid or sulfuric acid greatly increases the speed of reaction.

The following examples are illustrative of the present invention but are not to be construed as limiting.

*Example 1.—4-bromo-21-acetoxy-17α-hydroxypregnane-3,11,20-trione*

To one gram (2.46 millimoles) of 21-acetoxy-3α,17α-dihydroxypregnane-11,20-dione [prepared from 3α,17α - dihydroxypregnane - 11,20 - dione (Sarett, J. Am. Chem. Soc. 70, 1454 (1949)) by bromination in the 21-position using bromine in chloroform at about room temperature and subsequent replacement of the 21-bromine atom by reaction with potassium acetate in refluxing acetone] dissolved in 48 milliliters of tertiary butyl alcohol, was added 1.5 milliliters of water and 695 milligrams (5.04 millimoles) of N-bromoacetamide. The mixture was allowed to stand for two and one-half days at room temperature, at the end of which time all of the N-bromoacetamide was consumed. The resulting crystals were filtered off and washed with tertiary butyl alcohol. The yield was 505 milligrams (42.5 percent) of 4-bromo-21-acetoxy-17α-hydroxypregnane-3,11,20-trione, which decomposed at 203–204 degrees centigrade. The specific rotation was $[\alpha]_D^{24}$ plus 109 degrees (chloroform).

*Analysis.*—Calculated for $C_{23}H_{31}O_6Br$: Br, 16.6. Found: Br, 15.36.

A second crop was obtained by dilution of the mother liquors with three volumes of water and cooling, the yield being 405 milligrams (34.0 percent). The specific rotation was $[\alpha]_D^{24}$ plus 97 degrees in chloroform. A third crop of 4-bromo-21 - acetoxy-17α-hydroxypregnane-3,11,20-trione, which can be converted to the dihydro acetate by reduction with zinc in acetic acid, is obtained by extracting the aqueous tertiary butyl alcohol filtrate with methylene chloride. In this manner the conversion to the desired 4-bromo compound is 85–90 percent.

*Example 2.—4-chloro-21-acetoxy-17α-hydroxypregnane-3,11,20-trione*

To two grams (4.92 millimoles) of 21-acetoxy-3α,17α-dihydroxypregnane-11,20-dione dissolved in 96 milliliters of tertiary butyl alcohol and three milliliters of water was added 1.64 grams (12.3 millimoles) of N-chlorosuccinimide. The mixture was allowed to stand for one and one-half days at room temperature. The resulting crystalline product was filtered off, washed with tertiary butyl alcohol, and the solid product dried in a vacuum desiccator. The yield was 1.125 grams (52.1 percent) of 4-chloro-21-acetoxy-17α-hydroxypregnane-3,11,20-trione, having a melting point of 239–243 degrees centigrade. The specific rotation was $[\alpha]_D^{24}$ plus 100 degrees (acetone).

*Analysis.*—Calculated for $C_{23}H_{31}O_6Cl$: C, 62.8; H, 7.11; Cl, 8.07. Found: C, 62.86; H, 7.36; Cl, 9.32.

This compound and other 4-chloro-21-acyloxy-17α-hydroxypregnane-3,11,20-triones are useful intermediates in the preparation of cortisone acetate.

*Example 3.—4-bromo-21-acetoxy-17α-hydroxypregnane-3,11,20-trione*

To 0.75 gram (1.845 millimoles) of 21-acetoxy-3α,17α-dihydroxypregnane-11,20-dione dissolved in 48 milliliters of tertiary butyl alcohol and 1.5 milliliters of water was added 1.19 grams (5.73 millimoles of 3-bromo - 5,5 - dimethylhydantoin. The mixture was allowed to stand for seven days at room temperature. The resulting crystals were filtered off and washed with twenty percent aqueous alcohol. The solid was dried in a vacuum desiccator. The yield was 61.7 percent of 4-bromo-21-acetoxy-17α-hydroxypregnane-3,-11,20-trione rotating at plus 100 degrees at 24 degrees centigrade (acetone). A second crop of 4-bromo-21-acetoxy-17α-hydroxypregnane-3,11,-20-trione (21.5 percent yield) was obtained upon dilution of the filtrate of the first crop with water.

*Example 4.—4-bromo-21-acetoxy-17α-hydroxypregnane-3,11,20-trione*

In the manner of Example 1, 4-bromo-21-acetoxy - 17α - hydroxypregnane-3,11,20-trione is prepared using 1,3-dibromo-5,5-dimethylhydantoin instead of N-bromoacetamide.

*Example 5.—4-bromo-21-propionoxy-17α-hydroxypregnane-3,11,20-trione*

In the manner of Example 1, 4-bromo-21-propionoxy-17α-hydroxypregnane - 3,11,20-trione is prepared using 21-propionoxy-3α,17α-dihydroxypregnane-11,20-dione instead of 21-acetoxy-3α,17α-dihydroxypregnane-11,20-dione.

*Example 6.—4-bromo-21-acetoxy-17α-hydroxypregnane-3,11,20-trione*

In the manner of Example 1, 4-bromo-21-acetoxy-17α-hydroxypregnane-3,11,20-trione is prepared from 21 - acetoxy - 3α,17α - dihydroxypregnane - 11,20 - dione, using N - bromosuccinimide instead of N - bromoacetamide as the oxidizing - halogenating agent.

*Example 7.—4-chloro-21-propionoxy-17α-hydroxypregnane-3,11,20-trione*

In exactly the same manner as given in Example 2, 4 - chloro - 21 - propionoxy - 17α - hydroxypregnane - 3,11,20 - trione is prepared from 21 - propionoxy - 3α,17α - dihydroxypregnane-11,20 - dione and N - chlorosuccinimide.

*Example 8.—4-bromo-21-acetoxy-17α-hydroxypregnane 3,11,20-trione*

The starting 21 - acetoxy - 3β,17α - hydroxypregnane - 11,20 - dione is prepared in the following manner. Pregnane - 3,11,20 - trione [Reichstein and Fuchs, Helv. Chim. Acta. 26 721 (1943)] is reduced with Raney nickel catalyst in methanol giving 3β - hydroxypregnane - 11,20 - dione which is then treated with acetic anhydride or other anhydride containing paratoluenesulfonic acid to give the 3β,20 - diacetoxy - 17(20) - pregnene - 11 - one. Treatment of this latter compound with peracetic acid in chloroform followed by saponification with dilute alkali gives 3β,17α - dihydroxypregnane - 11,20-dione. Bromination of this compound with bromine in chloroform at about room temperature is producitve of bromination in the 21 - position and subsequent replacement of the 21-bromine atom by reaction with potassium acetate in refluxing acetone gives the starting 3α, 17α - dihydroxy - 21 - acetoxy or other acyloxy pregnane - 11,20 - dione (Sarett J. Am. Chem. Soc. 70, 1454 (1948)).

In the manner of Example 1, the 4-bromo-21-acetoxy - 17α - hydroxypregnane - 3,11,20 - trione is prepared using the 21 - acetoxy - 3β,17α-dihydroxypregnane - 11,20 - dione instead of the 21 - acetoxy - 3α,17α - dihydroxypregnane-11,20 - dione.

Following the procedure of Example 1, other 4 - bromo or 4 - chloro 21 - acyloxy - 17α - hydroxypregnane - 3,11,20 - triones are prepared using the appropriate 21 - acyloxy - 3β,17α - dihydroxy - pregnane - 11,20 - dione and the requisite oxidizing - halogenating agent, e. g., N - bromoacetamide, N - bromosuccinimide, N-chlorosuccinimide, 3 - bromo - 5,5 - dimethylhydantoin or 1,3 - dibromo - 5,5 - dimethylhydantoin.

*Example 9.—4-chloro-21-octanoyloxy-17α-hydroxypregnane-3,11,20-trione*

In exactly the same manner as of example 2, 4-chloro - 21 - octanoyloxy - 17α - hydroxypregnane - 3,11,20 - trione is prepared using 21-octanoyloxy - 3α,17α - dihydroxypregnane - 11, 20 - dione instead of 21 - acetoxy - 3α,17α-dihydroxypregnane - 11,20 - dione.

In the same manner as given in Examples 1 through 9, starting with the corresponding 21-acyloxy - 3,17 - dihydroxy - pregnane - 11,20-dione, the following compounds are prepared: 4 - bromo - 21 - formoxy - 17 - hydroxypregnane - 3,11,20 - trione; 4 - chloro - 21 - formoxy-17 - hydroxypregnane - 3,11,20 - trione; 4 - bromo - 21 - butanoyloxy - 17 - hydroxypregnane-3,11,20 - trione; 4 - chloro - 21 - butanoyloxy-17 - hydroxypregnane - 3,11,20 - trione; 4 - bromo - 21 - valeroyloxy - 17 - hydroxypregnane-3,11,20 - trione; 4 - chloro - 21 - valeroyloxy-17 - hydroxypregnane - 3,11,20 - trione; 4-bromo - 21 - hexanoyloxy - 17 - hydroxypregnane - 3,11,20 - trione; 4 - chloro - 21 - hexanoyloxy - 17 - hydroxypregnane - 3,11,20 - trione; 4 - bromo - 21 - heptanoyloxy - 17 - hydroxypregnane - 3,11,20 - trione; 4 - chloro - 21 - heptanoyloxy - 17 - hydroxypregnane - 3,11,20 - trione; 4 - bromo - 21 - octanoyloxy - 17 - hydroxypregnane - 3,11,20 - trione, and the like.

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:

1. A process for the concurrent oxidation and halogenation of a 21 - acyloxy - 3,17 - dihydroxypregnane - 11,20 - dione to a 4 - halo - 21 - acyloxy - 17 - hydroxypregnane - 3,11,20 - trione, which comprises: mixing (a) a reagent selected from the group consisting of N-bromoacetamide, N - bromosuccinimide, N - chlorosuccinimide, 3-bromo - 5,5 - dimethylhydantoin, 1,3 - dibromo - 5,5 - dimethylhydantoin, and (b) a 21 - acyloxy-3,17 - dihydroxypregnane - 11,20 - dione, wherein the acyloxy group contains up to and including eight carbon atoms, in an organic solvent which is not subject to oxidation or halogenation under the conditions of the reaction to cause conversion of the three-hydroxy group of the steroid nucleus to a three-keto group and to cause halogenation at carbon atom four of the steroid nucleus, and separating the 4 - halo - 21 - acyloxy - 17 - hydroxy - pregnane - 3,11,20-trione thus produced.

2. A process for the concurrent oxidation and halogenation of 21 - acyloxy - 3,17 - dihydroxypregnane - 11,20 - dione to a 4 - halo - 21 - acyloxy - 17 - hydroxypregnane - 3,11,20 - trione which comprises: mixing, in a proportion of at least that theoretically required for production of the desired result, (a) a reagent capable of producing oxidation and halogenation, and selected from the group consisting of N-bromoacetamide, N - bromosuccinimide, N - chlorosuccinimide, 3 - bromo - 5,5 - dimethylhydantoin, and 1,3 - dibromo - 5,5 - dimethylhydantoin, and (b) a 21 - acyloxy - 3,17 - dihydroxypregnane - 11,20 - dione, wherein the acyloxy group contains up to and including eight carbon atoms in an organic solvent which is not subject to oxidation or halogenation under the conditions of reaction, at a temperature below about fifty degrees centigrade, to cause conversion of the three-hydroxy group of the steroid nucleus to a three-keto group and to cause halogenation at carbon atom four of the steroid nucleus, and separating the 4 - halo - 21 - acyloxy - 17 - hydroxypregnane - 3,11,20 - trione thus produced.

3. A process which comprises: mixing, in a proportion of at least about two moles to one, (a) an agent capable of producing oxidation and halogenation and selected from the group consisting of N - bromoacetamide, N - bromosuccinimide, N-chlorosuccinimide, 3-bromo-5,5-dimethylhydantoin, and 1,3-dibromo-5,5-dimethylhydantoin, and (b) a 21-acyloxy-3,17-dihydroxypregnane-11,20-dione, wherein the acyloxy group contains up to and including eight carbon atoms in tertiary butyl alcohol containing up to about eighteen percent water by volume, at a temperature between about fifteen and about forty degrees centigrade, to cause conversion of the three-hydroxy group of the steroid nucleus to a three-keto group and to cause halogenation at carbon atom four of the steroid nucleus, and separating the 4 - halo-21-acyloxy-17-hydroxypregnane-3,11,20-trione thus produced.

4. A process which comprises: mixing, in a proportion of at least about two moles to one, (a) N-chlorosuccinimide and (b) a 21-acyloxy-3,17-dihydroxypregnane-11,20-dione, wherein the acyloxy group contains up to and including eight carbon atoms, in an organic solvent which is not subject to oxidation or chlorination under the conditions of the reaction, at a temperature below about fifty degrees centigrade, to cause conversion of the three-hydroxy group of the steroid nucleus to a three-keto group and to cause chlorination at carbon atom four of the steroid nucleus and separating the 4-chloro-21-acyloxy-17 - hydroxypregnane - 3,11,20 - trione thus produced.

5. A process which comprises: mixing, in a proportion of at least about two moles to one, (a) N - chlorosuccinimide and (b) 21 - acetoxy-3α,17α-dihydroxypregnane-11,20-dione in an organic solvent which is not subject to oxidation or chlorination under the conditions of the reaction, at a temperature below about fifty degrees centigrade, to cause conversion of the three-hydroxy group of the steroid nucleus to a three-keto group and to cause chlorination at carbon atom four of the steroid nucleus, and separating the 4-chloro-21-acetoxy-17α-hydroxypregnane-3,11,20-trione thus produced.

6. A process which comprises: mixing an excess of (a) N-chlorosuccinimide with (b) 21-acetoxy-3α,17α-dihydroxypregnane-11,20-dione, in tertiary butyl alcohol solvent containing up to about eighteen percent water by volume, at a temperature between about fifteen degrees and about forty degrees centigrade, to cause conversion of the three-hydroxy group of the steroid nucleus to a three-keto group and to cause chlorination at carbon atom four of the steroid nucleus, and separating the 4-chloro-21-acetoxy-17α-hydroxypregnane-3,11,20-trione thus produced.

7. A process which comprises: mixing, in a proportion of at least about two moles to one, (a) N-bromoacetamide and (b) a 21-acyloxy-3,17-dihydroxypregnane-11,20-dione wherein the acyloxy group contains up to and including eight carbon atoms, in an organic solvent which is not subject to oxidation or bromination under the conditions of the reaction, at a temperature below about fifty degrees centigrade, to cause conversion of the three-hydroxy group of the steroid nucleus to a three-keto group and to cause bromination at carbon atom four of the steroid nucleus and separating the 4-bromo-21-acyloxy-17-hydroxypregnane-3,11,20-trione thus produced.

8. A process which comprises: mixing, in a proportion of at least about two moles to one, (a) N-bromoacetamide and (b) 21-acetoxy-3α,17α-dihydroxypregnane-11,20-dione in an organic solvent which is not subject to oxidation or bromination under the conditions of the reaction, at a temperature between about fifteen and about forty degrees centigrade, to cause conversion of the three-hydroxy group of the steroid nucleus to a three-keto group and to cause bromination at carbon atom four of the steroid nucleus and separating the 4-bromo-21-acetoxy-17α-hydroxypregnane-3,11,20-trione thus produced.

9. A process which comprises: mixing an excess of (a) N-bromoacetamide with (b) 21-acetoxy-3α,17α-dihydroxypregnane-11,20-dione in tertiary butyl alcohol containing up to about eighteen percent water by volume, at a temperature between about fifteen and about forty degrees centigrade, to cause conversion of the three-hydroxy group of the steroid nucleus to a three-keto group and to cause bromination at carbon atom four of the steroid nucleus and separating the 4-bromo-21-acetoxy-17α-hydroxypregnane-3,11,20-trione thus produced.

10. A process which comprises: mixing, in a proportion of at least about two moles to one, (a) N-bromosuccinimide and (b) a 21-acyloxy-3,17-dihydroxypregnane-11,20-dione wherein the acyloxy group contains up to and including eight carbon atoms, in an organic solvent which is not subject to oxidation or bromination under the conditions of the reaction, at a temperature below about fifty degrees centigrade to cause conversion of the three-hydroxy group of the steroid nucleus to a three-keto group and to cause bromination at carbon atom four of the steroid nucleus and separating the 4-bromo-21-acyloxy-17-hydroxypregnane-3,11,20-trione thus produced.

11. A process which comprises: mixing, in a proportion of at least about two moles to one, (a) N-bromosuccinimide and (b) 21-acetoxy-3,17-dihydroxypregnane-11,20-dione in an organic solvent which is not subject to oxidation or bromination under the conditions of the reaction, at a temperature between about fifteen and about forty degrees centigrade to cause conversion of the three-hydroxy group of the steroid nucleus to a three-keto group and to cause bromination at carbon atom four of the steroid nucleus and separating the 4-bromo-21-acetoxy-17-hydroxypregnane-13,11,20-trione thus produced.

12. A process which comprises: mixing an excess of N-bromosuccinimide with 21-acetoxy-3,17-dihydroxypregnane-11,20-dione in tertiary butyl alcohol containing up to about eighteen percent water by volume, at a temperature between about fifteen and about forty degrees centigrade to cause conversion of the three-hydroxy group of the steroid nucleus to a three-keto group and to cause bromination at carbon atom four of the steroid nucleus and separating the 4-bromo - 21 - acetoxy - 17 - hydroxypregnane-3,11,20-trione thus produced.

13. A process which comprises: mixing, in a proportion of at least about two moles to one, (a) 3-bromo-5,5-dimethylhydantoin and (b) a 21 - acyloxy - 3,17 - dihydroxypregnane - 11,20-dione, wherein the acyloxy group contains up to and including eight carbon atoms, in an organic solvent which is not subject to oxidation or halogenation under the reaction conditions, at a temperature below about fifty degrees centigrade to cause conversion of the three-hydroxy group of the steroid nucleus to the three-keto group and to cause bromination at carbon atom four of the steroid nucleus and separating the 4-bromo-21-acyloxy-17-hydroxypregnane-3,11,20-trione thus produced.

14. A process which comprises: mixing, in a proportion of at least about two moles to one, (a) 3-bromo-5,5-dimethylhydantoin and (b) 21-acetoxy-3,17-dihydroxypregnane-11,20-dione in an organic solvent which is not subject to oxidation or halogenation under the reaction conditions, at a temperature between about fifteen and about forty degrees centigrade to cause conversion of the three-hydroxy group of the steroid nucleus to a three-keto group and to cause bromination at carbon atom four of the steroid nucleus and separating the 4-bromo-21-acetoxy-17-hydroxypregnane-3,11,20-trione thus produced.

15. A process which comprises: mixing an excess of 3-bromo-5,5-dimethylhydantoin with 21-acetoxy-3,17-dihydroxypregnane-11,20-dione in tertiary butyl alcohol containing up to about eighteen percent water by volume, at a temperature between about fifteen and about forty degrees centigrade to cause conversion of the three-hydroxy group of the steroid nucleus to a three-keto group and to cause bromination at carbon atom four of the steroid nucleus and separating the 4-bromo-21-acetoxy-17-hydroxypregnane-3,11,20-trione thus produced.

16. A process which comprises: mixing, in a proportion of at least about one mole to one, (a) 1,3-dibromo-5,5dimethylhydantoin and (b) a 21 - acyloxy - 3,17 - dihydroxypregnane - 11,20-dione, wherein the acyloxy group contains up to and including eight carbon atoms, in an organic solvent which is not subject to oxidation or halogenation under the reaction conditions, at a temperature below about fifty degrees centigrade to cause conversion of the three-hydroxy group of the steroid nucleus to the three-keto group and to cause bromination at carbon atom four of the steroid nucleus and separating the 4-bromo-21-acyloxy-17-hydroxypregnane-3,11,20-trione thus produced.

17. A process which comprises: mixing, in a proportion of at least about one mole to one, 1,3-dibromo-5,5-dimethylhydantoin and 21-acetoxy-3,17-dihydroxypregnane-11,20-dione in an organic solvent which is not subject to oxidation or halogenation under the reaction conditions, at a temperature between about fifteen and about forty degrees centigrade to cause conversion of the three-hydroxy group of the steroid nucleus to a three-keto group and to cause bromination at carbon atom four of the steroid nucleus and separating the 4-bromo-21-acetoxy-17-hydroxypregnane-3,11,20-trione thus produced.

18. A process which comprises: mixing an excess of 1,3-dibromo-5,5-dimethylhydantoin with 21 - acetoxy - 3,17 - dihydroxypregnane - 11,20-dione in tertiary butyl alcohol containing up to about eighteen percent water by volume, at a temperature between about fifteen and about forty degrees centigrade to cause conversion of the three-hydroxy group of the steroid nucleus to a three-keto group and to cause bromination at carbon atom four of the steroid nucleus and separating the 4-bromo-21-acetoxy-17-hydroxypregnane-3,11,20-trione thus produced.

ARTHUR R. HANZE.
ROBERT H. LEVIN.

References Cited in the file of this patent

UNITED STATES PATENTS

| Number | Name | Date |
| --- | --- | --- |
| 2,369,065 | Marker | Feb. 6, 1945 |
| 2,541,104 | Sarett | Feb. 13, 1951 |
| 2,584,159 | Rosenkranz | Feb. 5, 1952 |